United States Patent [19]

Lambert

[11] 4,084,777

[45] Apr. 18, 1978

[54] STABILIZING APPARATUS INCORPORATING TELESCOPIC STRUCTURES

[75] Inventor: Bernard Léon Lambert, Montceau les Mines, France

[73] Assignee: Societe Anonyme Potain Poclain Materiel (P.P.M.), France

[21] Appl. No.: 760,655

[22] Filed: Jan. 19, 1977

[30] Foreign Application Priority Data

Jan. 27, 1976 France ................................ 76 02146

[51] Int. Cl.$^2$ ............................ B60S 9/12; B60S 9/00

[52] U.S. Cl. .................................... 248/287; 212/145; 248/354 H; 280/766

[58] Field of Search ...................... 248/287, 357, 188.9, 248/354 R, 354 H; 280/766, 763, 761; 212/145

[56] References Cited

U.S. PATENT DOCUMENTS

| | | | |
|---|---|---|---|
| 3,007,717 | 11/1961 | Noly | 280/766 |
| 3,194,414 | 7/1965 | Tourneau | 212/145 |
| 3,243,052 | 3/1966 | Grove | 212/144 X |
| 3,716,252 | 2/1973 | Johnson | 280/766 |
| 3,768,088 | 10/1973 | Risius | 280/766 X |
| 3,840,125 | 10/1974 | Cozad | 212/145 |
| 3,953,052 | 4/1976 | Palmcrantz | 212/145 X |

*Primary Examiner*—J. Franklin Foss
*Attorney, Agent, or Firm*—Weingarten, Maxham & Schurgin

[57] ABSTRACT

Stabilization apparatus for a tower crane or other mobile equipment includes several telescopic structures. Each structure includes an inner telescopic part and an outer telescopic part and an actuator for moving the parts to a fully extended position. The inner telescopic part carries a plate which is applied in use to the ground and is controlled by a secondary telescopic structure. When the main telescopic structure is extended there is some sag so that a detector intended to indicate achievement of the extended position is not actuated. When the secondary telescopic structure is actuated and the plate is in firm contact with the ground the sag is corrected and the detector is actuated.

2 Claims, 7 Drawing Figures

STABILIZING APPARATUS INCORPORATING TELESCOPIC STRUCTURES

BACKGROUND OF THE INVENTION (a) Field of the Invention

This invention relates to stabilizing apparatus for mobile equipment.

(b) Summary of the Prior Art

Stabilizing apparatus incorporating telescopic structures have been proposed which in their fully extended configuration have their free ends subjected to the action of a thrust load.

This applies to the telescopic beam of a stabilization apparatus of a mobile crane, the beam being disposed transversely on the frame of the equipment and the movable part carrying an arm itself supporting a plate intended to be applied to the ground. In order to achieve the most effective stabilization the movable part is placed in its fully extended position with the plate firmly applied to the ground.

This also applies to a telescopic tower of a crane during operation in its fully extended configuration.

An object of the present invention is to detect the configuration in which a telescopic structure similar to that which has just been briefly described, accommodates the loads in a particular direction of thrust and to provide this detection in one configuration only.

SUMMARY OF THE INVENTION

According to the present invention there is provided in a telescopic structure an inner telescopic part, an outer telescopic part receiving telescopically the inner telescopic part, an arm capable of accommodating a thrust in a predetermined direction different from the direction of the telescopic action and connected to one of the two telescopic parts and being mounted on said inner telescopic part, a position-detector including a casing and a movable member, the casing being secured to one of the telescopic parts, a projection secured to the other of the telescopic parts, the projection being disposed to operate the movable member, the movable member being effectively actuable only in a single predetermined relative position of the two telescopic parts and in which a thrust is exerted on the said arm in the said direction and the projection is disposed opposite to the movable member and is moved towards the movable member by a displacement in a direction substantially the same as the thrust direction, the inner part carrying the thrust arm being subject to the action of the said thrust.

The movable member of the detector is effectively only actuated in a single relative position of the two parts in which, on the one hand, a thrust is exerted on the arm in the said direction, and on the other hand, the projection is disposed opposite to the movable member and is brought towards it by a slight displacement, in a direction substantially the same as that of the thrust, of the part provided with a thrust arm under the action of the said thrust.

Preferably, guide members, such as rollers, fixed, on the one hand, on the outer part adjacent to its outer end, and on the other hand, on the inner part adjacent to its inner end, one of the two members, detector and projection, is fixed on the inner part adjacent to its inner end, while the other of the two said members is secured to the outer part adjacent to its outer end. The said predetermined relative position of the two parts being the fully extended position of the structure, said slight displacement corresponds to the change of the support relationship of the inner part on the outer part by the upper guide member secured to the inner end of the inner part and the lower guide member secured on the outer end of the outer part in one configuration and by the upper guide member secured to the outer end of the outer part and the lower guide member secured to the inner end of the inner part in the other configuration.

DESCRIPTION OF THE PREFERRED EMBODIMENT

The embodiment of stabilizing apparatus forming part of mobile equipment is intended to eliminate the risk of tilting of this equipment when the apparatus is in its fully extended configuration and is supported by the ground.

Corresponding parts of the stabilization apparatus of FIGS. 1A, 1B, 1C and 1D, have the same references in each Figure but with the suffixes A, B, C and D.

Figure 1A:
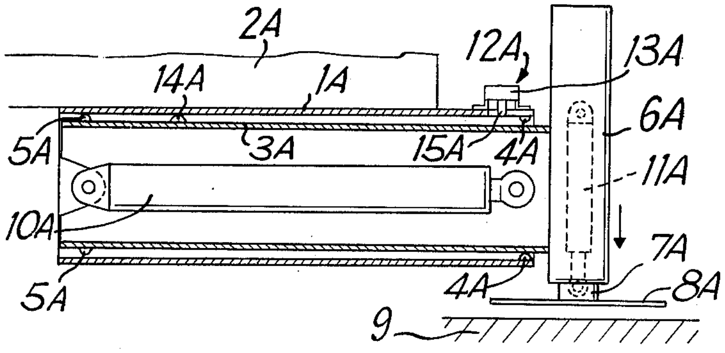
FIG. 1A is a diagrammatic axial section of a beam in a first configuration, of stabilizing apparatus in accordance with the invention.

Referring to FIG. 1A, it will be noted that the apparatus serves to ensure stabilization of the equipment of which it forms part and comprises an outer part 1A secured to the structure 2A of the equipment and by an inner part 3A which is retracted in this configuration into the part 1A. Both parts 1A and 3A are hollow and may be of cylindrical or box section.

Guide members lie between the two parts 1A and 3A and are secured to end portions of these parts. They may comprise rollers 4A at the outer end portion of the outer part 1A and rollers 5A at the inner end portion of the inner part 3A.

A telescopic arm comprising an outer member 6A and an inner member 7A is mounted at the free end of the inner part 3A. A support plate 8A is disposed substantially horizontally on the lower end face of the inner member 7A of the arm and faces the ground; in the configuration shown the plate 8A is not in contact with the ground.

A hydraulic actuator 10A interconnects the members 1A and 3A, to provide telescopic action and a hydraulic actuator 11A interconnects the member 6A and 7A again to provide for telescopic action.

Figure 2B:
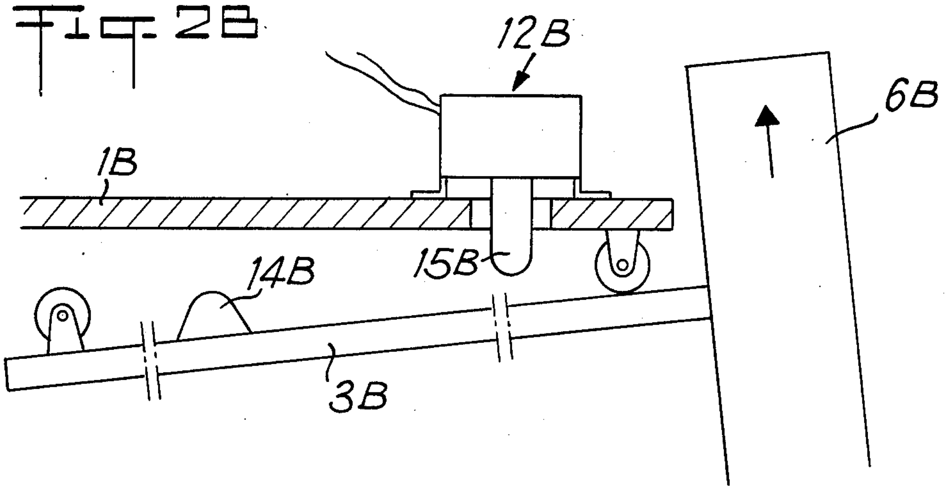
FIGS. 2B, 2C and 2D show diagrammatic details respectively of the apparatus of FIGS. 1B, 1C, 1D.
Figure 2C:
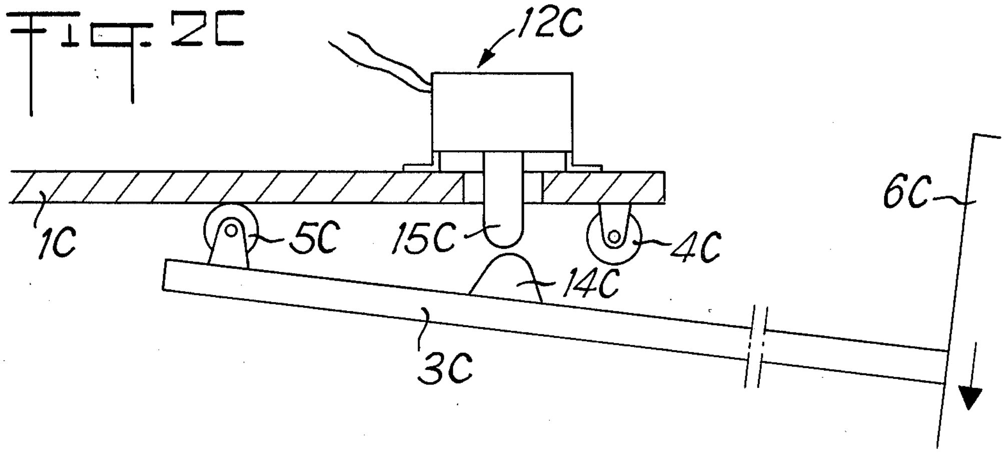
Figure 2D:
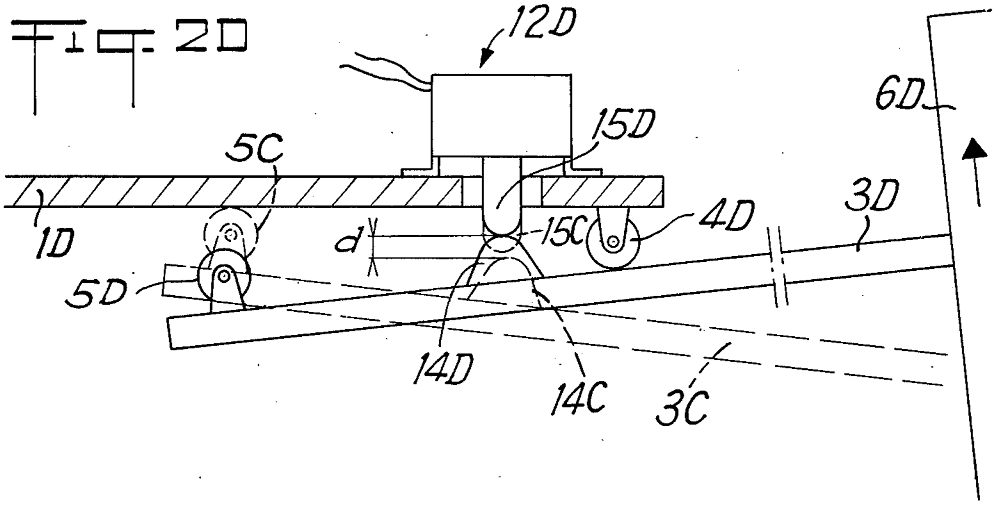

A micro-switch 12A has a casing 13A secured to the outer end portion of the outer part 1A adjacent the rollers 4A, and a projection or actuating cam 14A is mounted on the inner end portion of the inner part 3A in order to operate the movable member 15A of the micro-switch 12A. The constructional details are shown in FIGS. 2B, 2C and 2D. In the configuration of FIG. 1A, the projection 14A is spaced from the movable member 15A and is therefore not actuated in this configuration.

Figure 1B:
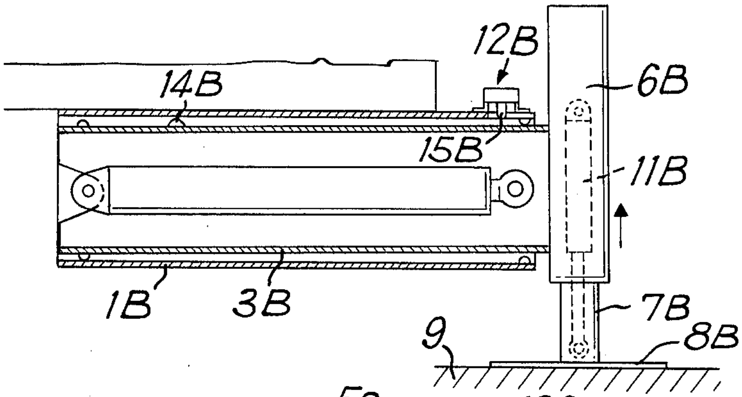
FIG. 1B is a diagrammatic section of the beam of FIG. 1A in a second configuration.

Referring to FIGS. 1B and 2B, the configuration is shown in which the part 3B is retracted into the part 1B, while the member 7B is partially extended with respect to the member 6B under the action of the hydraulic actuator 11B, the support plate 8B being in firm contact with the ground 9. Again, the projection 14B is not opposite to the movable member 15B of the micro-switch 12B, and hence the movable member 15B is not actuated.

Figure 1C:
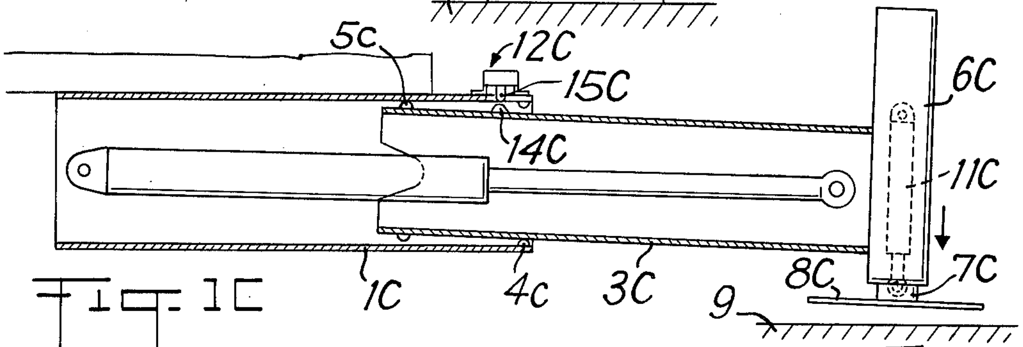
FIG. 1C is a diagrammatic section of the beam of FIG. 1A in a third configuration.

The configuration is shown in FIGS. 1C and 2C in which the part 3C is fully extended with respect to the part 1C, the projection 14C being then disposed opposite to the movable member 15C of the micro-switch 12C. However, since the member 7C is in a retracted position in the member 6C under the action of the hydraulic actuator 11C, the support plate 8C is not in contact with the ground 9. As a consequence, under the action of its own weight, the member 3C sags slightly about the lower roller 4C which causes the projection 14C to be spaced from the movable member 15C, which means that the movable member 15C is not actuated. The part 3C is supported by the lower and upper rollers 4C and 5C.

Figure 1D:
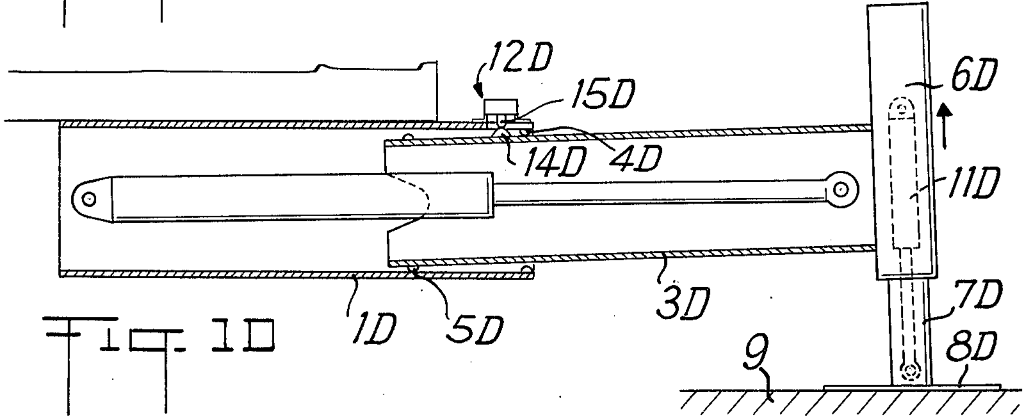
FIG. 1D is a diagrammatic section of the beam of FIG. 1A in a fourth configuration.

Finally, referring to FIGS. 1D and 2D, the configuration is illustrated in which the part 3D is fully extended. The projection 14D is disposed opposite to the movable member 15D of the micro-switch 12D. The hydraulic actuator 11D has extended the member 7D with respect to the member 6D, which causes firm application on the ground of the plate 8D. This firm application causes in its turn a slight upward tilting of the part 3D, which is now in abutment with the upper roller 4D of the member 1D. Thus, the projection 14D contacts the movable member 15D which is thereby actuated. In FIG. 2D the displacement *d* of the projection between the positions 14C and 14D is shown, this displacement constituting a return of the member 14D with respect to the movable member 15D of the micro-switch which changes from non-actuated configuration to actuated configuration. The part 3D is supported by the upper rollers 4D and lower rollers 5D.

In the explanation which has just been given, it will have been understood that the movable member of the micro-switch is actuated only when two circumstances occur simultaneously:

It is necessary first of all that the inner part 3D should be fully extended with respect to the outer part 1D;

It is then necessary that the support plate 8D should be firmly applied to the ground 9.

The aim which the invention effectively seeks to achieve is to detect, by means of the micro-switch 12D, when the particular configuration of FIGS. 1D and 2D is reached.

The plate 8A may be pivoted to the member 7A. Furthermore, the extended configuration of the parts 3C or 3D with respect to the parts 1C or 1D is defined either by abutments welded on each part or by the piston of the hydraulic actuator 10A reaching its maximum stroke. Finally, the rollers 4A, 5A may be replaced by slide members.

I claim:

1. In a telescopic structure
an inner telescopic part,
an outer telescopic part receiving telescopically the inner telescopic part,
an arm capable of accommodating a thrust in a predetermined direction different from the direction of the telescopic action and connected to one of the two telescopic parts and being mounted on said inner telescopic part,
a position-detector including
a casing and
a movable member, the casing being secured to one of the telescopic parts,
a projection secured to the other of the telescopic parts, the projection being disposed to operate the movable member,
the movable member being effectively actuable only in a single predetermined relative position of the two telescopic parts and in which a thrust is exerted on the said arm in the said direction and the projection is disposed opposite to the movable member and is moved towards the movable member by a displacement in a direction substantially the same as the thrust direction, the inner part carrying the thrust arm being subject to the action of the said thrust.

2. A telescopic structure according to claim 1, comprising
guide members secured on the outer telescopic part adjacent to its outer end portion and on the inner part adjacent its inner end,
one of the two parts, position detector and projection, being secured to the inner telescopic part adjacent the inner end of that telescopic part,
the other of the parts, position detector and projection, being secured to the outer telescopic part adjacent to the outer end thereof, and
the said predetermined relative position of the two telescopic parts corresponding to the fully extended position of the structure, and
the said displacement corresponds to the change in support of the inner telescopic part on the outer telescopic part by the upper guide member secured to the inner end of the inner part and the lower guide member secured to the outer end of the outer telescopic part, in one configuration, and by the upper guide member secured to the outer end of the outer telescopic part and the lower guide member secured to the inner end of the inner telescopic part, in the other configuration.

* * * * *